United States Patent
Naderer et al.

(10) Patent No.: US 9,993,922 B2
(45) Date of Patent: Jun. 12, 2018

(54) ACTIVE HANDLING APPARATUS AND METHOD FOR CONTACT TASKS

(71) Applicant: FerRobotics Compliant Robot Technology GmbH, Linz (AT)

(72) Inventors: Ronald Naderer, St. Florian (AT); Paolo Ferrara, Kematen an der Krems (AT); Andreas Rohrhofer, St. Peter/AU (AT)

(73) Assignee: FerRobotics Compliant Robot Technology GmbH, Linz (AT)

(*) Notice: Subject to any disclaimer, the term of this patent is extended or adjusted under 35 U.S.C. 154(b) by 44 days.

(21) Appl. No.: 15/168,650

(22) Filed: May 31, 2016

(65) Prior Publication Data
US 2016/0271797 A1 Sep. 22, 2016

Related U.S. Application Data (63) Continuation of application No. 14/005,369, filed as application No. PCT/EP2012/054596 on Mar. 15, 2012, now Pat. No. 9,375,840.

(30) Foreign Application Priority Data

Mar. 16, 2011 (DE) .......................... 10 2011 005 627
Apr. 1, 2011 (DE) .......................... 10 2011 006 679

(51) Int. Cl.
*B25J 9/16* (2006.01)
*B25J 11/00* (2006.01)
*B25J 17/02* (2006.01)

(52) U.S. Cl.
CPC ........... *B25J 9/1633* (2013.01); *B25J 9/1687* (2013.01); *B25J 11/0065* (2013.01);
(Continued)

(58) Field of Classification Search
CPC .... B25J 9/1633; B25J 9/1612; B25J 17/0208; B25J 11/0065; G05B 2219/49356;
(Continued)

(56) References Cited

U.S. PATENT DOCUMENTS 5,112,338 A 5/1992 Anspach, III
5,448,146 A 9/1995 Erlbacher
(Continued)

FOREIGN PATENT DOCUMENTS

DE 102008050519 A1 4/2010
DE 102010003697 A1 10/2011
(Continued)

OTHER PUBLICATIONS

"Aktiver Kontaktflansch", FerRobotics GmbH, Austria, Dec. 2010.
German Patent and Trademark Office, Office Action dated Nov. 30, 2011 for DE Application 102011006679.9.

*Primary Examiner* — Spencer D Patton
(74) *Attorney, Agent, or Firm* — Murphy, Bilak & Homiller, PLLC (57) ABSTRACT

An apparatus for automated contact tasks and a related method are described. The apparatus includes a mechanical interface for connecting the apparatus to a manipulator, a holder for receiving a tool and being movable in relation to the mechanical interface, at least one actuator for positioning the holder in relation to the mechanical interface, a sensor unit that senses the actuator force provided by the at least one actuator, and a control unit that sets the actuator force to a desired minimum force to press the holder against a stop, while there is no contact between the tool and a surface, and detects contact when the holder moves in relation to the mechanical interface in opposition to the direction of the desired minimum force. The control unit further regulates the actuator force according to a pre-programmed contact (Continued)

force time-characteristic, when contact between the tool and the surface has been detected.

17 Claims, 6 Drawing Sheets

(52) U.S. Cl.
CPC . *B25J 17/0208* (2013.01); *G05B 2219/39319* (2013.01); *G05B 2219/39349* (2013.01); *G05B 2219/39577* (2013.01); *G05B 2219/49356* (2013.01); *Y10S 901/09* (2013.01)

(58) Field of Classification Search
CPC ........... G05B 2219/49357; G05B 2219/37355; G05B 2219/39319; G05B 2219/39577
See application file for complete search history.

(56) References Cited

U.S. PATENT DOCUMENTS

| | | |
|---|---|---|
| 5,509,848 A | 4/1996 | Shimbara |
| 6,390,888 B1 | 5/2002 | Amano et al. |
| 2003/0132726 A1 | 7/2003 | Dohring et al. |
| 2009/0132726 A1 | 5/2009 | Daniell et al. |

FOREIGN PATENT DOCUMENTS

| | | |
|---|---|---|
| EP | 1057592 A1 | 12/2000 |
| JP | H077890 U | 2/1995 |
| JP | H11207613 A | 8/1999 |

ACTIVE HANDLING APPARATUS AND METHOD FOR CONTACT TASKS

CROSS-REFERENCE TO RELATED APPLICATIONS

This application is a continuation application of U.S. patent application Ser. No. 14/005,369 filed on Sep. 16, 2013, which is a national phase application of International Patent Application No. PCT/EP 2012/054596 filed on Mar. 15, 2012, which claims priorities to German National Patent Application Nos. 10 2011 005 627.0 filed on Mar. 16, 2011, and 10 2011 006 679.9 filed on Apr. 1, 2011, the content of each of said applications incorporated herein by reference in their entirety.

TECHNICAL FIELD

The present disclosure relates to an active handling apparatus as well as to a method for automated contact tasks (manipulating and positioning tasks) such as, for example, the robot-supported processing (machining) of surfaces or the manipulation of machine elements or workpieces during operations such as, for example, mounting, stacking, sorting, etc.

BACKGROUND

Different apparatuses are known for robot-supported, automated contact tasks such as, for example, the processing (machining) of surfaces (e.g., grinding, polishing, etc.) as well as the manipulation of workpieces or machine elements (stacking, palletizing, mounting, etc.). The grinding apparatus described in publication U.S. Pat. No. 5,299,389 can be named as an example. In the case of this apparatus, a rotating grinding disk is moved toward the surface to be ground by means of an industrial robot. The contact between the grinding disk and the surface is recognized by means of the load current of the motor driving the grinding disk, which provides a method which is too imprecise for many applications. In general, in the case of robot-supported automated systems where the robot contacts an object, the problem consists in recognizing the moment of contact and the closed-loop control of the contact force.

Even in the case of modern, force-regulated systems, when the tool which is mounted on the robot contacts the surface to be contacted a shock-like contact force occurs which may not be a problem in many cases, but in applications where precision is crucial or where very sensitive workpieces have to be processed or machined, it is extremely troublesome and undesirable. It is only possible to regulate the contact force once the robot has contacted the surface, and consequently in practical applications the mentioned shock-like contact force is a necessary evil which can certainly be reduced (for example by inserting a passively flexible element in the drive train) but cannot be eliminated. The passive flexibility of a spring, however, acts in an uncontrolled manner and can disturb the desired process.

Known force-regulated systems are frequently not able to react quickly enough in the case of very rapid (i.e. high-frequency) disturbances, such as, for example, jerks or impacts, as the regulated drive train has a certain inertia which results in a corresponding reaction time. In the case of rigid systems (such as, for example, standard industrial robots) even the smallest displacements, if effected too quickly, will result in a high increase in the force.

In view of the above, there is a general need for an active handling apparatus (effector) for a manipulator such as an industrial robot, wherein the handling apparatus should be designed for the purpose of contacting surfaces in a practically jolt-free manner and subsequently of jerk-free control of the contact force.

SUMMARY

A handling apparatus for automated contact tasks is described herein. In accordance with one exemplary embodiment, the handling apparatus includes the following components: a mechanical interface for releasably or fixedly connecting the handling apparatus to a manipulator; a holder, which is movable in relation to the interface, for receiving a tool; at least one gearless actuator for positioning the holder in relation to the interface to the manipulator; a sensor unit for directly or indirectly determining the force acting on the at least one actuator; and a closed-loop control unit which is configured to control the at least one actuator to press the holder at an adjustable minimum force ($F_0$) against a stop as long as there is no contact between the handling apparatus and a surface, and to control the contact force (over time) when there is contact between the handing apparatus and the surface, wherein once contact has been recognized, the contact force is increased from the minimum force ($F_0$) to a predeterminable desired force ($F_{DESIRED}$).

BRIEF DESCRIPTION OF THE DRAWINGS

The invention can be better understood with reference to the following description and drawings. The components in the figures are not necessarily to scale, emphasis instead being placed upon illustrating the principles of the invention. Moreover, in the figures, like reference numerals designate corresponding parts. In the drawings:

FIG. 9 illustrates (a) the relationship between the spring length and the distance between plates established by the

DETAILED DESCRIPTION

A prerequisite for the absence of static-friction and jerking of the actuator is the use of gearless actuators. These types of actuators are, for example, pistonless, pneumatic actuators (bellow-type pneumatic cylinders and pneumatic muscles), pneumatic cylinders with a piston mounted in a static friction-free manner (for example a glass cylinder with a graphite piston or other material combinations) and gearless, electric linear units with an armature mounted in a static-friction-free manner (for example air-bearing or magnetic-bearing armatures). In the passive (i.e. non-regulated) case, very flat force-displacement characteristic curves of the handling apparatus can be achieved using these types of actuators.

Figure 1:
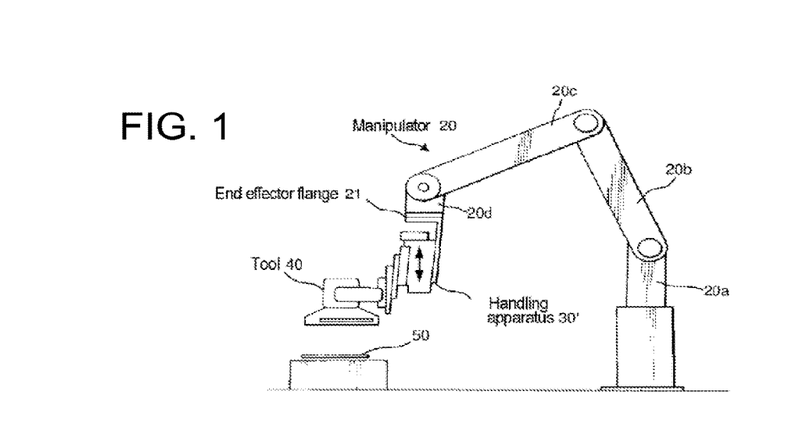
FIG. 1 shows a representation of a robot-supported automated grinding device with a manipulator, a grinding machine and a handling apparatus for the grinding machine which is arranged between the manipulator and the grinding machine.

FIG. 1 illustrates, as one exemplary embodiment, a representation of a robot-supported automated grinding device with an industrial robot as a manipulator 20, a grinding machine 40 as a workpiece and a handling apparatus 30', which is arranged between an end effector flange 21 of the manipulator 20 and the tool 40 and is used substantially for precision control or for closed-loop controlling in a precise manner the movement of the tool 40 in relation to a workpiece 50 to be machined as well as for closed-loop controlling of the force exerted onto the workpiece 50 by the tool 40. The construction of the manipulator 20 is of secondary importance. A standard industrial robot with four arm segments 20a, 20b, 20c and 20d is used in the present example. The task of the manipulator essentially consists in positioning the tool 40 in an operating position on or above the workpiece 50 to be machined. Closed-loop controlling of the position in a precise manner and in particular closed-loop controlling of the force in a precise manner is carried out by means of the handling apparatus 30'. This latter is realized in the present case for the purpose of moving the tool 40 (grinding machine) toward the workpiece 50 and, on contact, for exerting a contact force onto the workpiece 50. Thus, for example, a grinding disk of the grinding machine is able to be pressed onto the workpiece 50 at a certain force in order, for example, to obtain a certain grinding effect. As a result of closed-loop controlling of the force, the force can then also be held, for example, constant if the grinding disk is partly worn. To control the force, it is necessary to determine a measuring variable for the contact force which can be realized, for example, by means of a load cell or by means of the motor current of the grinding machine. An example of an automatic grinding device shown in FIG. 1 is explained in more detail, for example, in publication U.S. Pat. No. 5,299,389.

Precise positioning of the tool 40, as well as controlling the force with only the manipulator would be possible, in principle, but doing so places very high demands on the manipulator. Precise positioning, as well as controlling the force in an exact and rapid manner as may be desired, for example, for many contact tasks, is only possible using very expensive manipulators. For this reason, a handling apparatus which carries out the abovementioned positioning and force regulating task is situated between the end effector flange of the manipulator and the actual tool (e.g. grinding or polishing machine, gripper, etc.). The accuracy demands that the manipulator must fulfill can then be relatively small. Such types of handling apparatuses are also called "active flanges".

In general, in the case of robot-supported or automated systems where the robot contacts an object, the problem is recognizing the moment at which contact is made and regulating the contact force. It is not possible to regulate the contact force until the robot has contacted the surface. For this reason, in the case of all known force-regulated systems, a shock-like contact force initially occurs when contact is made between the tool mounted on the robot and the surface to be contacted. t Not only the mass (i.e. the inertia and consequently the kinetic energy) of the tool and of the handling apparatus is present in this impact force, but also the mass or the kinetic energy of the entire manipulator together with the drives. This mass essentially determines the impact energy (to be avoided).

The resultant shock-like contact force may not be a problem in many cases, however in applications where precision is important or very sensitive workpieces have to be machined or treated, it is extremely disturbing and undesirable. This means that the actual force overshoots in comparison to the desired force. Also during the machining of a surface (or during the handling of an object) the position of the tool has to be adjusted in order to maintain the desired contact force. In this case, above all it is the effects of static-friction (the co-called "stick-slip effect") which can lead to transient overshooting in the contact force. In addition, in the case of geared drives the meshing of the teeth of the gear wheels can cause unwanted jerky impacts of vibrations. When handling or machining objects, both effects can lead to quality defects.

The above-explained overshooting is usually reduced in robotics by inserting passive elastic elements into the drive train. Said elements, however, act in an uncontrolled manner and are consequently not usable for precise handling and contact tasks, as their mechanically defined performance characteristic (force-displacement characteristic curve) is fixedly predetermined and is not controllable in an automated manner.

Figure 2:
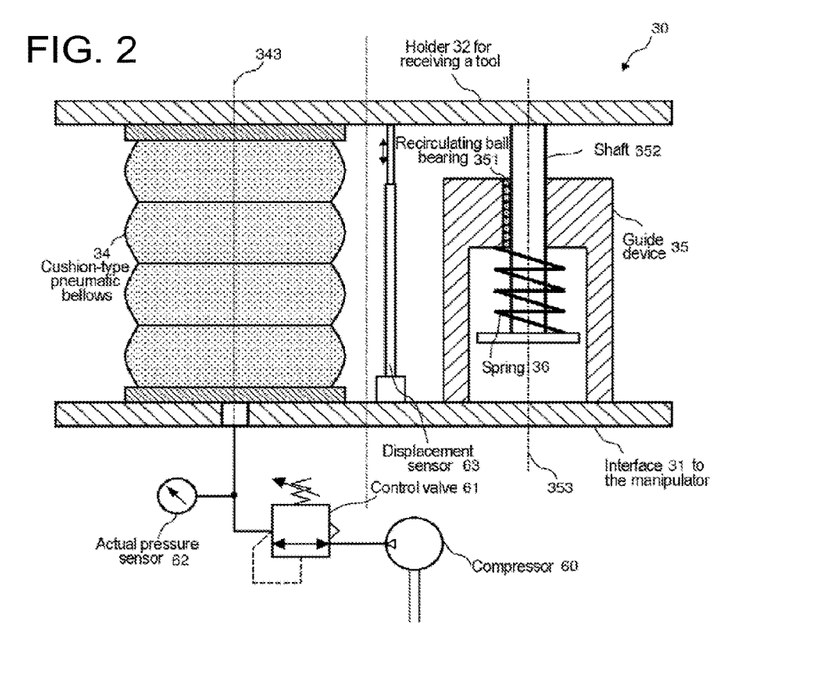
FIG. 2 illustrates by means of a schematic diagram an example of a handling apparatus as claimed in the invention with one degree of freedom, a bellow-type pneumatic cylinder working in opposition to a spring provided as an actuator.

FIG. 2 shows an exemplary embodiment of a handling apparatus (active flange). A first flange part of the apparatus forms an interface 31 to a manipulator (for example to the end effector flange 21 of the manipulator 20 from FIG. 1). A second flange part 32 forms a holder 32 for a tool (such as, for example, a grinding machine or a gripping means). A static friction-free linear actuator which, in the present example is realized as a bellow-type pneumatic cylinder 34, is arranged between the two flange parts. Static friction-free actuators are, for example, bellow-type pneumatic cylinders and pneumatic artificial muscles (PAMs). As an alternative to this, it is also possible to use pneumatic cylinders with a piston mounted in a static friction-free manner which usually consist of glass and operate with a graphite piston. A further alternative is provided by electric direct drives, in particular gearless linear drives which are mounted in a static friction-free manner (e.g. by means of ball-bearings, magnetic or air-cushion bearings). These types of drives are also inherently elastic, either as a result of the compressibility of the air (in the case of pneumatic actuators) or as a result of the magnetic restoring force (in the case of electric direct drives).

The apparatus additionally includes a guide device 35 which blocks all the degrees of freedom of movement, with the exception of the degree of freedom of movement of the static friction-free linear actuator 34. The guide device 35 must also not allow any notable static-friction between it and the shaft 352 guided therein. Said freedom from static-friction can be ensured, for example, by the use of roller bearings such as, for example, linear ball bearings, in particular recirculating ball bearings. In the example shown in FIG. 2, a rotationally fixed shaft guide 35, 352 is provided with recirculating ball bearings 351. Consequently, the handling apparatus has precisely one degree of freedom, namely a translatory movement in the direction of the longitudinal axis 353 of the shaft guide 35 which lies naturally parallel to the longitudinal axis 343 of the linear actuator (bellow-type pneumatic cylinder 34).

A compressor 60 generates the necessary overpressure in the pneumatic system in order to drive the pneumatic linear actuator 34. In this case, the bellow-type pneumatic cylinder 34 shown in FIG. 2 can only generate a compression force on extension. The abovementioned pneumatic artificial muscle, in contrast, only generates a tensile force on contraction. For this reason, a restoring force, which is provided, for example, by a (tensile or compression) spring, has to act on the linear actuator. In the example from FIG. 2, the shaft 352 of the shaft guide is held back by the compression spring 36 such that a pre-stressed force acts on the top flange part (holder 32) in the direction of the bottom flange part (interface 31 to the manipulator). The linear actuator 34 is moved actively in opposition to said pre-stressed force. The pressure in the linear actuator 34 is generated by means of the compressor 60 and is adjustable by means of an electronically actuated control valve 61 in accordance with a desired value (desired pressure). The actual pressure in the linear actuator 34 (actual pressure) is measured using a pressure sensor 62. In addition, a linear potentiometer is provided as a displacement sensor 63 which supplies a measured value for the current displacement of the linear actuator 34 and consequently the relative position of the holder 32 (in relation to the interface 31 to the manipulator or in relation to the end effector flange of the manipulator).

The pressure-dependent force-displacement characteristic curve of the pneumatic linear actuator is usually known so that the actuator force provided by the linear actuator 34 on the flange parts 31 and 32 is accessible to indirect measurement. I.e. the actuator force can easily be calculated from the measured pressure in the actuator and the measured deflection (lift) of the actuator. In this case, the force-displacement characteristic curve of pneumatic linear actuators is usually provided with a hysteresis so that the direction of the movement is also included in the force calculation. In the case of an electric direct drive, the actuator force could, for example, be determined in a similar manner by means of a characteristic curve e.g. by means of current consumption.

The restoring spring force can also be calculated from the force-displacement characteristic curve of the spring and of the measured deflection. If a tool which is fastened on the holder 32 of the handling apparatus contacts a workpiece, the difference between the actuator force and the restoring force is then the net force exerted onto the tool, which can be regulated in a conventional manner. In order to determine from this the force that actually acts on the surface, the weight of the tool 40 (cf. FIG. 1) and its spatial position in relation to the surface of the workpiece must additionally be taken into consideration.

It is possible to regulate the position with only the measured value for the deflection of the actuator 34 without any contact. In addition, the flexibility (or rigidity) of the handling apparatus 30 can be regulated (impedance regulating), i.e. the rigidity of the arrangement produced from the linear actuator and the restoring spring is regulated in accordance with a desired value.

As a result of the elasticity inherent to a pneumatic actuator and the freedom from static-friction of the arrangement, the aforementioned overshooting of the contact force is reduced to a minimum. As a result of said elastic performance characteristic, the mass and inertia of the moved elements of the manipulator (robot arms and drives) is uncoupled from the tool and, as a result, from the workpiece in the effective direction of the elasticity. Consequently, only the much smaller mass of the tool is decisive to the kinetic energy. This reduces the impact energy mentioned above when contact between the workpiece and the tool takes place.

In addition, as a result of the freedom from static-friction and of the gearless drive, overshooting of the contact force is almost completely eliminated in operation when there is active force regulation. Regulating the force in a jerk-free manner is therefore made possible whereas, in the case of conventional handling apparatuses, unwanted variations always occur in the contact force as a result of the effects of static-friction, it not being easily possible to compensate for these unwanted variations by means of regulation.

Figure 3:
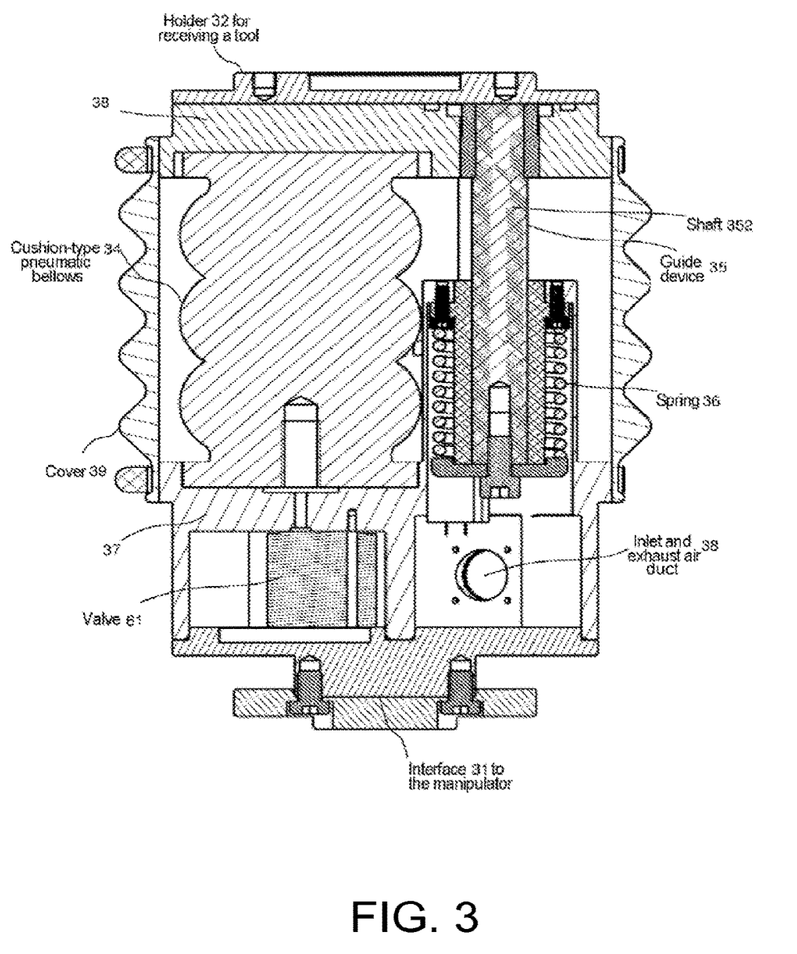
FIG. 3 shows a detailed sectional representation of a handling apparatus which is constructed according to the example from FIG. 2.

FIG. 3 shows a detailed sectional representation through the handling apparatus which is constructed according to the principle shown in FIG. 2. The active flange shown includes a first flange part 31 as the interface to the manipulator, the end effector flange 21 of which is shown, for example, in FIG. 1, as well as a second flange part 32 as the holder or receiving means for a tool. The geometry of the two flange parts is standard in robotics. A housing part 37, in which both the control valve 61 and the static friction-free shaft guide are arranged with a restoring spring in accordance with the same principle as shown in FIG. 2, is rigidly connected to the first flange part 31. For protection against dust and other contaminants, a shock absorber is provided as a cover 39 between the flange parts 31 and 32. Said cover can also be realized in a liquid and/or dust tight manner for use under water, in a rough environment or in clean rooms. The bellow-type pneumatic cylinder 34 serves as the static friction-free, gearless linear actuator. The linear actuator is arranged between the first housing part 37 and a second housing part 38 which is rigidly connected to the holder 32.

The displacement sensor 63 shown in FIG. 2 is covered in the present example by the guide device 35 and cannot be seen. The pressure sensor and the compressor are not included in the representation from FIG. 3 for reasons of clarity. Connections for the inlet air duct and outlet air duct 38 can be arranged, for example, in the first housing part 37. The connection to the inlet air duct is, for example, connected to the compressor 60 via a hose. The connection for the outlet air duct is, for example, covered by a sound absorber. For underwater applications, the outlet air duct can also be connected to a hose which directs the outlet air up to the surface of the water in order to prevent the inflow of water into the pneumatic system. As a result of the outlet air duct being implemented as a hose, outlet air is also prevented from flowing out in the case of sensitive processes.

Figure 4:
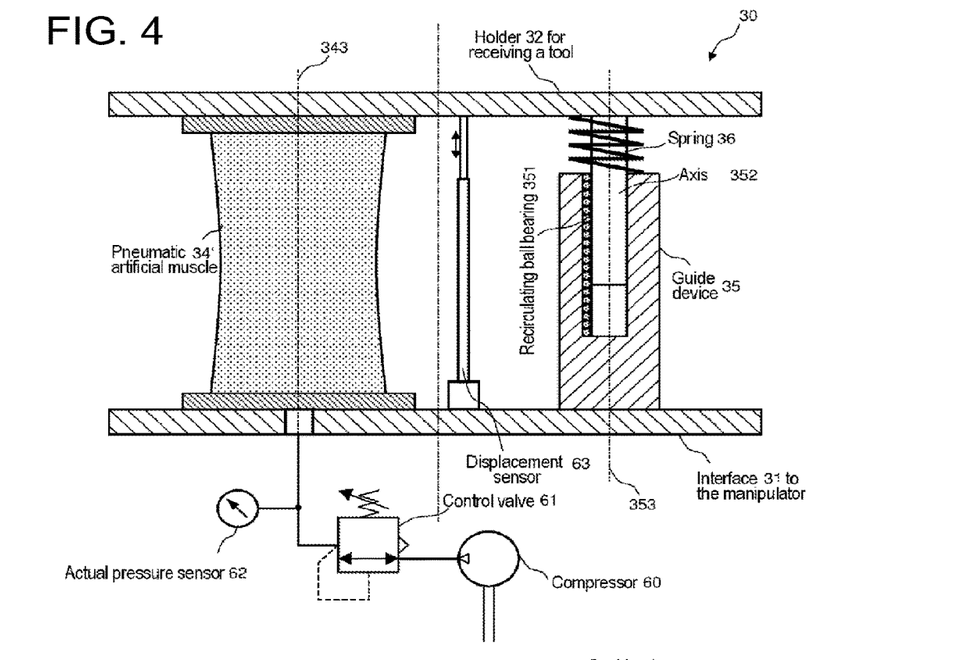
FIG. 4 illustrates by means of a schematic diagram a further example of a handling apparatus with one degree of freedom, a pneumatic muscle working in opposition to a spring provided as an actuator.

FIG. 4 shows a further exemplary embodiment of a handling apparatus, where a pneumatic artificial muscle 34' is used in place of a bellow-type pneumatic cylinder. The spring 36 in this example is arranged such that the two flange parts 31, 32 (the holder and the interface to the manipulator) are pressed apart from one another, while the pneumatic artificial muscle 34' exerts a tensile force which is directed in opposition to the spring force. For the rest, the arrangement from FIG. 4 is designed in an identical manner to the example shown in FIG. 2. In the pressure-free state, the apparatus from FIG. 4, however, moves into an end position at maximum deflection, whereas the apparatus from FIG. 2 moves into an end position at minimum deflection (i.e.

distance between the flange parts 31 and 32), which can be advantageous for safety reasons.

Quite generally speaking, the advantage of the apparatus according to the embodiments described herein is, among others, that in the case of loss of energy, the system is pulled back into a start position and nevertheless remains passively movable. Even after an emergency shutdown (e.g. on account of exceeding an admissible maximum force) the apparatus remains passively supple and any possibly jammed parts are able to be released.

Figure 5:
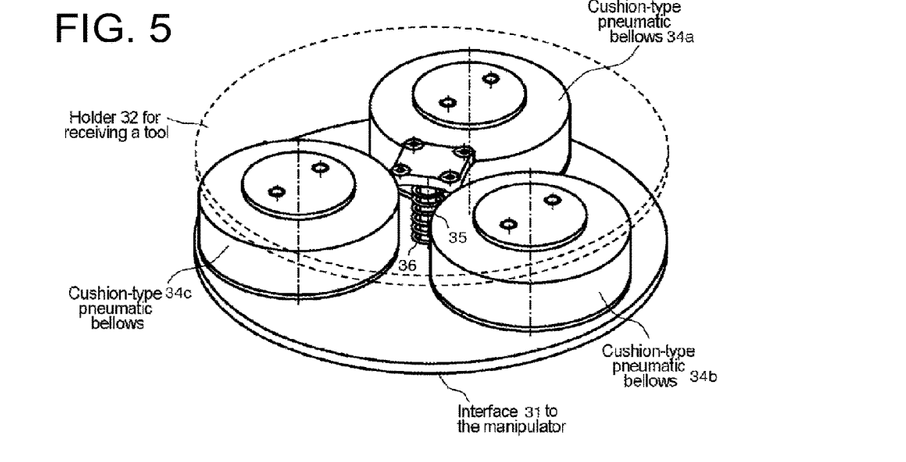
FIG. 5 illustrates by means of a schematic diagram a further example of a handling apparatus with three degrees of freedom, three bellow-type pneumatic cylinders working in opposition to a spring provided as the actuators.

FIG. 5 shows a simplified representation of a further exemplary embodiment. The handling apparatus (active flange) shown in FIG. 5 has three degrees of freedom compared to the examples shown in FIGS. 2 to 4, namely one translatory degree of freedom (displacement in the direction of the longitudinal axes of the bellow-type pneumatic cylinders 34a, 34b, 34c) and two rotational degrees of freedom (tilting about two rotational axes which lie normally with respect to the longitudinal axes of the bellow-type pneumatic cylinders 34a, 34b, 34c). In the case of three degrees of freedom, it is also necessary to have three static friction-free pneumatic linear actuators 34a, 34b, 34c which are arranged in the present case evenly around a center axis of the handling apparatus. The remaining design of the handling apparatus such as, for example, the actuation of the static friction-free pneumatic linear actuators is, in principle, identical to the examples from FIGS. 2 to 4. The static friction-free guide device 35 is also constructed in a substantially identical manner to the example from FIG. 4 (in the present case, a tension spring 36' is used to generate a restoring force for the bellow-type pneumatic cylinder), however, the guide shaft 352 is not rigidly connected to the top flange part (which forms the holder 32), but is connected, for example, by means of a ball joint or a Cardan joint (not shown) in order to make the abovementioned tilting movement possible. Depending on the application, the joint can be rotationally fixed so that (as in the present example) only tilting movements of the top flange part are possible but not rotation.

The restoring force does not in principle have to be generated by a spring, but could also be provided by a second static friction-free pneumatic linear actuator. Thus, for example, in the example from FIG. 2 a pneumatic artificial muscle (PAM, cf. FIG. 4) which is arranged parallel to the bellow-type pneumatic cylinder could also be used instead of the spring 36. As an alternative to this, the use of a double-acting static friction-free pneumatic cylinder is also possible.

Figure 6:
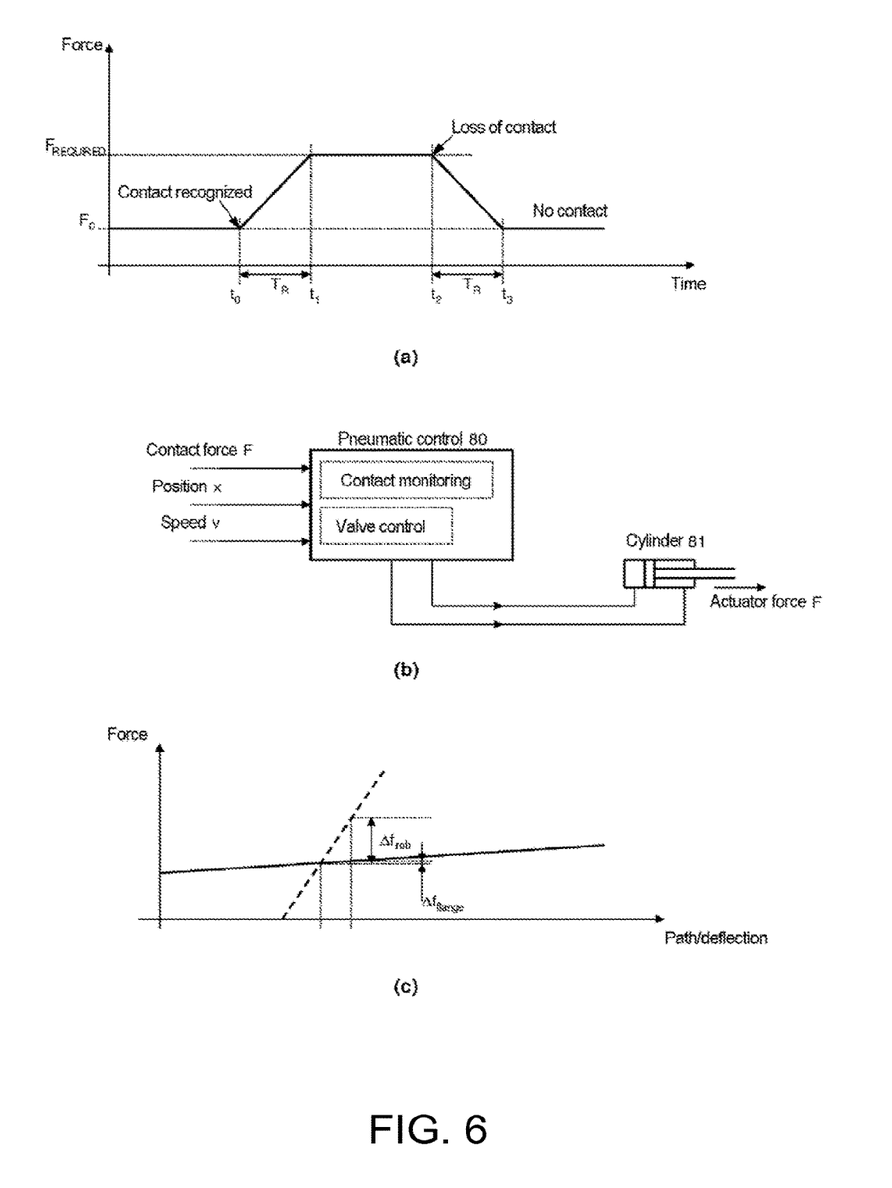
FIG. 6 illustrates the regulated force (over time) when effecting contact between the tool and the workpiece as well as loss of contact.

In FIG. 6, the force regulation (force control) implemented in the handling apparatuses according to the embodiments described herein is explained again in more detail. FIG. 6a shows the (regulated) time characteristic of the contact force (force over time) in one exemplary embodiment, FIG. 6b shows a schematic representation of the control unit 80 (closed-loop control unit) of the actuator, which drives the handling apparatus, in the present case a double-acting pneumatic cylinder 81 with a piston, which slides within the cylinder in a practically static friction-free manner. FIG. 6c illustrates the advantage of the very flat force-displacement characteristic curve of the handling apparatus in the passive (non-regulated) case, ensuring that the impact forces on contact with the workpiece are very slight.

In FIG. 6a the time-characteristic of the force F(t) exerted on the workpiece by the handling apparatus 30 is shown, the force F being regulated to a minimum value $F_0$ when there is no contact between the handling apparatus 30 and the workpiece 50 (cf. FIG. 1). The minimum force $F_0$ can be approximately zero, just large enough for the handling apparatus 30 to remain still fully extended (or, depending on the direction of force, fully retracted). In this state, contact monitoring, which activates the regulating of the contact force when a contact is effected, is active. In the example shown in FIG. 6a, at moments $t<t_0$ and $t>t_3$ there is no contact between the handling apparatus 30 and the workpiece 50 (more precisely, the contact occurs indirectly by means of the tool 40 which is mounted on the handling apparatus) and the pneumatic control means 80 holds the holder 32 of the handling apparatus (cf. FIG. 2) at minimum force $F_0$ against an end stop. In the present example, contact is recognized at moment to. In order to ensure as "supple" a contact as possible, a very small starting force $F_0$ (ideally zero) is necessary. Once contact has been recognized, the holder 32 of the handling apparatus 30 is no longer held against the end stop and the contact force is increased linearly to a desired force $F_{DESIRED}$ which is desired or necessary for the respective contact task (e.g. polishing, grinding, etc.). The increase in force from the minimum force $F_0$ to a desired force $F_{DESIRED}$ is effected inside a defined time interval $T_R$. In the present example, the desired force is obtained at moment t1 and the workpiece 50 is processed (or handled in another manner) by means of the handling apparatus. During this, contact monitoring by the control means 89 is again active in order to recognize a possible loss of contact.

In the present example, such loss of contact occurs at moment t2. As reaction to this, the holder 32 of the handling apparatus 30 is moved against the end stop again and the control means reduces the force inside a time interval $T_R$ from the desired force $F_{DESIRED}$ to the abovementioned minimum force $F_0$ in order to develop new contact, again in as "supple" a manner as possible. In the present case, the ramp-like increase after contact and the ramp-like drop in force after loss of contact are the same length (in both cases $T_R$). Depending on the application, the drop in force on loss of contact can also be effected more rapidly (e.g. force withdrawn as quickly as possible by means of pressure-less switching of the pneumatic cylinder).

FIG. 6c illustrates the mentioned gentle contact between the handling apparatus and the workpiece by way of a force-displacement characteristic curve. The passive (i.e. non-regulated) force-displacement characteristic curve of the handling apparatus can be set in a very flat manner (continuous characteristic curve) by means of a suitable mechanical structure of the handling apparatus as mentioned above. It will be possible to obtain values of, for example, only three Newton per millimeter displacement. In comparison with this, known force-regulated systems are relatively rigid and are not able to react quickly enough in the case of very rapid (i.e. high-frequency) disturbances, such as, for example, jerks or impacts, as the regulated drive train has a certain inertia which results in a corresponding reaction time. In the case of rigid systems (such as, for example, standard industrial robots) the smallest displacements Ls, when they are effected too rapidly, will result in a high increase $\Delta f_{rob}$ in the force, whereas the handling apparatus, as a result of its flat characteristic curve, brings about a negligibly small change in force $\Delta F_{flange}$ and the regulating of the force is gently applied only after contact has been recognized.

Details of different possibilities for contact recognition and for recognizing loss of contact are given again below. The abovementioned minimum force $F_0$ and the desired force $F_{DESIRED}$ always have the same preceding sign and the holder 32 always moves against the respective end stop when there is lack of contact. The end position can be recognized, for example, by means of the displacement sensor 63 (see FIG. 2). When the holder 32 of the handling apparatus 30 is situated in an end stop, it can be generally assumed from this that there is no contact between the handling apparatus 30 and the workpiece 40.

Proceeding from this state (holder 32 against an end stop), contact is detected as soon as the holder 32 moves in opposition to the desired force $F_{DESIRED}$ (for example a change in position detected by the displacement sensor 63) in relation to the manipulator interface 31. As at this moment the force is regulated to a minimum value $F_0$ and as a pneumatic actuator basically has a natural flexibility, the contact is very gentle and there are no jerks between the handling apparatus 30 and the workpiece 50.

Loss of contact is recognized, for example, whenever the change in the speed of the holder 32 of the handling apparatus 30 exceeds a predeterminable acceleration value. The speed of the holder 32 with reference to the manipulator interface 31 at the moment of the loss of contact is stored. If the speed again drops (without an end stop being reached), contact is again recognized. The change in speed can be measured either by means of the displacement sensor 62 or by using an acceleration sensor.

Figure 7:
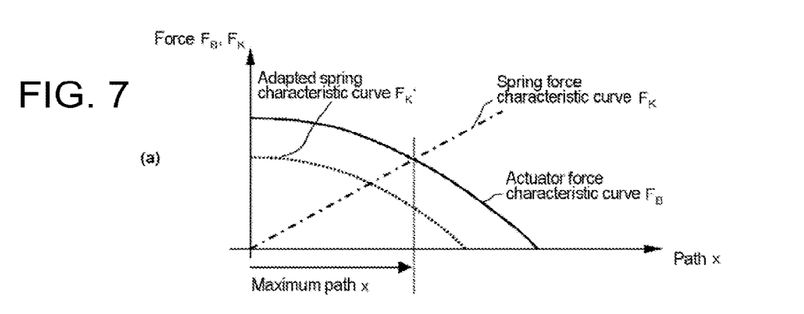
FIG. 7 illustrates the force-displacement characteristic curves of springs and cushion-type pneumatic cylinders as well as an adapted spring characteristic curve.

One problem that occurs in a good many practical applications results from the non-identical force-displacement characteristic curves of the bellow-type pneumatic cylinder or the pneumatic artificial muscle in relation to the spring (cf. characteristic curve diagram in FIG. 7). While springs generally have a restoring force which increases linearly (from the relaxed state) as the deflection increases, bellow-type pneumatic cylinders (as well as pneumatic artificial muscles) have a falling characteristic curve with significant non-linearity at a given internal pressure. The example from FIG. 2 or 3 is looked at below. The contact force acting on a surface to be contacted, in the steady state, is equal to the difference between the force $F_B$ of the bellow-type pneumatic cylinder 34 and the restoring force $F_K$ of the spring 36. In the case of an external contact force of zero, the adjusting path (the deflection) of the handling apparatus is, however, limited to the range of the force-displacement characteristic curve which lies to the left of the point of intersection between the spring characteristic curve and the actuator force characteristic curve. Where a contact force is greater than zero, the maximum adjusting path is correspondingly smaller. In order to be able to actually utilize the theoretically possible maximum lift of the linear actuator, it would be desirable for the spring characteristic curve to also have a falling characteristic curve (see adapted characteristic curve $F_K'$). In the ideal case, the spring characteristic curve would have the identical form as the actuator force characteristic curve. The offset—in this case adjustable by means of changes in pressure—between the characteristic curves then corresponds to the contact force which would be generatable independently of the deflection of the actuator if the characteristic curves were adapted in this manner.

Figure 8:
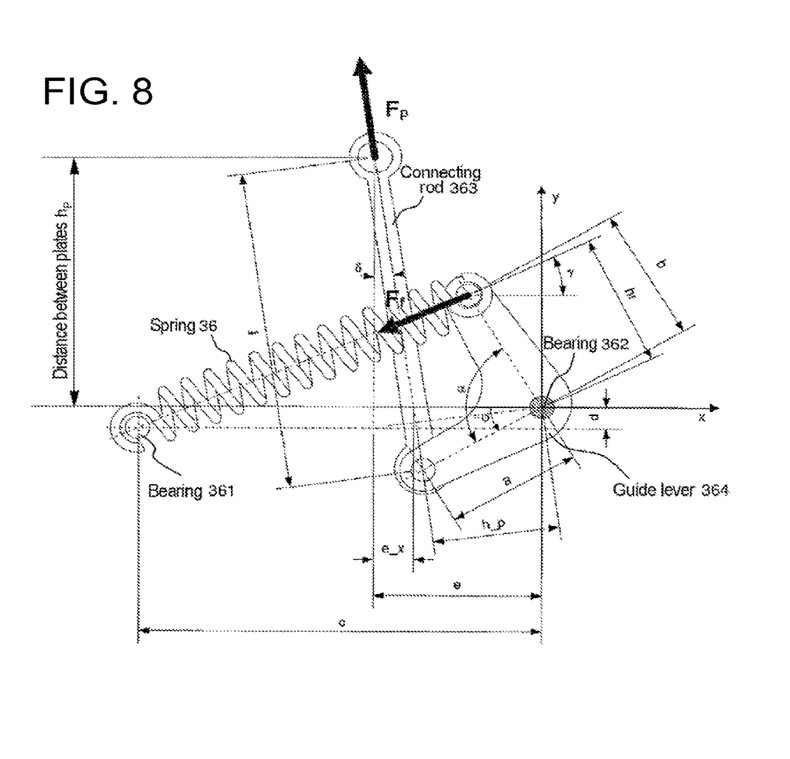
FIG. 8 shows a lever mechanism for adapting the force-displacement characteristic curve of a spring.
Figure 9:
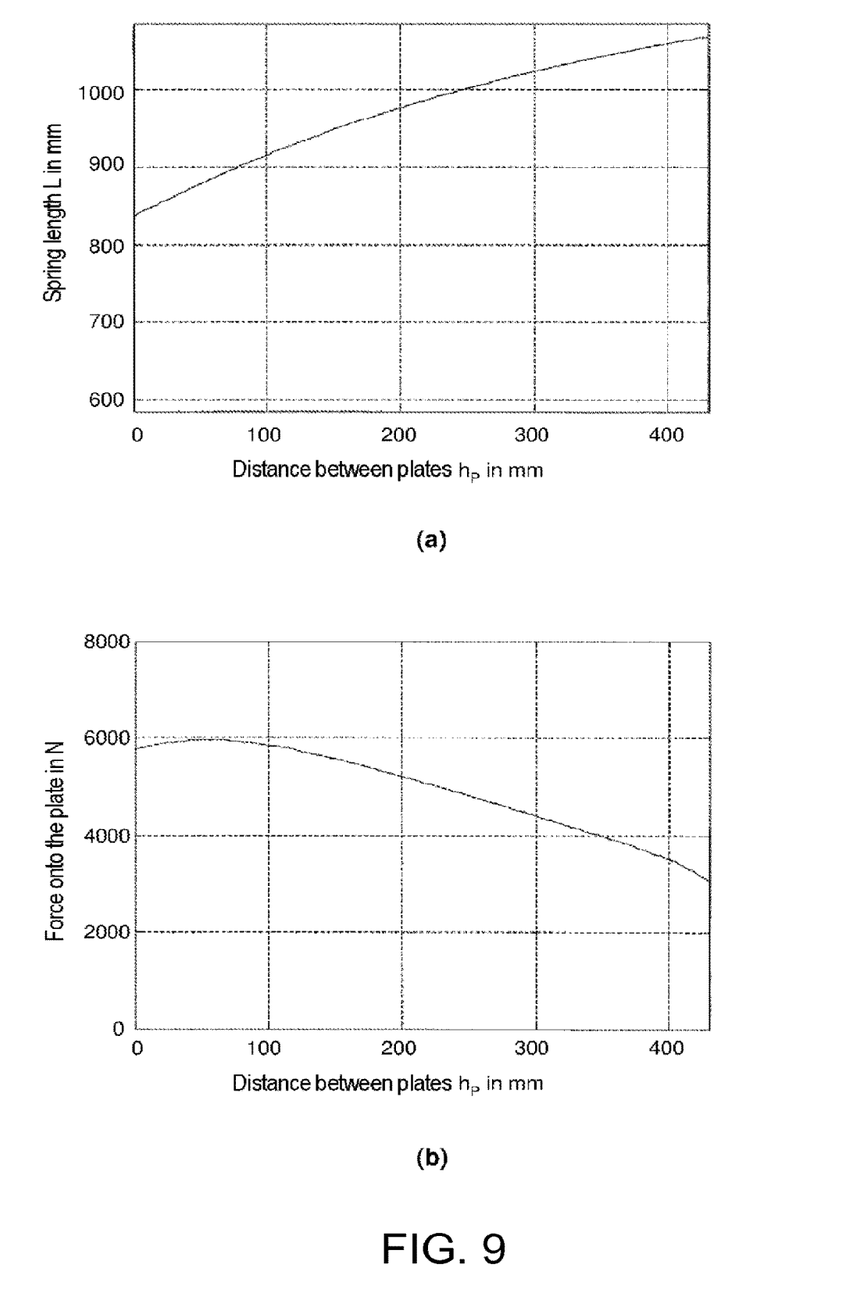

FIG. 8 shows a possibility of how, by means of a simple kinematic arrangement, the spring force characteristic curve is able to be adapted to the characteristic curve of the actuator—at least approximately. In the case of the mechanism shown in FIG. 8, the bearings 361 and 362 are rigidly connected to a flange part (for example the interface 31 to the manipulator) and the top end of the connecting rod 363 is connected to the other flange part (for example the holder 32 for the tool). A guide lever 364, which is for example L-shaped, is pivotably mounted on the bearing 362. The spring 36 (with an approximately linear characteristic curve) is clamped between the end of a leg of the guide lever 364 and the bearing 361. The connecting rod 363 is arranged between the end of the other leg of the guide lever 364 and the second flange part. The spacing between the two flange parts 31 and 32 is shown by means of the reference $h_p$ in FIG. 8. The force-displacement characteristic curve of the restoring force that acts between the plates in dependence on the spacing $h_p$ is shown in FIG. 9b. FIG. 9a shows the relationship between the length of the spring and the spacing $h_p$. As can be seen in FIG. 8b, the force-displacement characteristic curve of the system shown in FIG. 8, which is made up by the spring and the guide mechanism, is the same as the force-displacement characteristic curve of a bellow-type pneumatic cylinder or of a pneumatic artificial muscle, as a result of which the possible lift of a static friction-free pneumatic linear actuator can be utilized in a considerably better manner.

As a result of the static friction-free design, a handling apparatus according to the embodiments described herein can also be operated as only a "supple" (i.e. flexible) sensor unit for the contact force. In this case, the positioning of the tool is effected in part or exclusively by means of the manipulator (cf. manipulator 20 in FIG. 1). In this case, both a "mixed mode" and a "sensor-guided mode" are conceivable. In the "mixed mode", small and high-frequency adapting of positions and regulating the force are carried out by the handling apparatus, whereas the large-area, higher-ranking movement (rough positioning) is ensured by the manipulator. In the "sensor-guided mode", the handling apparatus acts as a passive sensor unit and the regulating work is carried out by the manipulator. The flexibility of such a sensor unit nevertheless allows the force to be regulated in a substantially jerk-free manner. In a pure sensor mode, the flexibility of the apparatus, that is the force-displacement performance characteristic (also called impedance) is also actively adjustable and adaptable to the respective application.

Information (measuring data) determined by means of the handling apparatus concerning the contact force and/or the position of the tool in relation to the end effector flange of the manipulator is fed back to the drive (or the drive units) of the manipulator in both cases (during "mixed mode" as well as "sensor-guided mode). In contrast to this, in "stand alone mode" the handling apparatus works independently of the manipulator and there is no feedback of measured data determined by means of the handling apparatus to the drive control means or drive regulating means of the manipulator. The manipulator executes a predetermined movement (for example to position the tool on the workpiece). Precision control and regulating the force are assumed by the handling apparatus, as described above, independently of the manipulator.

As a result of the inherent elasticity of the static friction-free linear actuator and the restoring spring, the handling apparatus (both in the mode as active flange and in pure measuring mode) protects the manipulator from jerks, impacts and similar short-term events which result in a sudden increase in the contact force and which a usual robot regulating means is not able to compensate.

In order to increase the accuracy of the force measurement, a load cell can be arranged between a linear actuator and a flange part 31 or 32 such that the force is not only determined in an arithmetical manner (for example from the direction of movement, the pressure and the deflection) but can also be measured directly.

One exemplary embodiment relates to a method for handling objects or for processing surfaces with a manipulator, a handling apparatus which is arranged on the manipulator as shown, for example, in FIGS. 2 to 5 and a tool which comes into contact with the object or the surface. The method includes positioning the tool by correspondingly deflecting the handling apparatus such that contact force corresponds to a predetermined desired value, it being possible for the desired value to be dependent on the position of the manipulator. The method additionally includes handling the object (for example positioning, stacking, etc.) or machining the surface (for example grinding, polishing, etc.). In this case, the position of the tool and the contact force determined by means of the handling apparatus are continuously monitored during handling or machining operations and where desired are also logged. Consequently, a processing report can be prepared for every workpiece and the workpiece can be correspondingly classified (for example as B grade goods if certain force tolerances have not been adhered to during machining or handling).

Some important aspects of a handling apparatus according to the embodiments described herein are summarized below:

A handling apparatus (active flange), which is suitable for automated contact tasks, includes as a mechanical interface, a first flange part for releasably or fixedly connecting the handling apparatus to a manipulator, as well as a second flange part which is movable in relation to the first flange part and is realized as a holder for receiving a tool. At least one gearless, static friction-free actuator serves to position the holder in relation to the first flange part. In addition, a sensor unit is provided to determine directly or indirectly the force acting on the at least one actuator. Finally, a closed-loop control unit ensures—on contact between a tool which is mounted on the holder and a surface—the regulating of the contact force in accordance with a predeterminable time characteristic of the contact force (force over time).

In addition, a mechanical guide device, which is mounted free of static-friction (for example by means of a roller bearing or an air-cushion bearing), can be arranged between the two flange parts, whereby the mechanical guide device blocks all mechanical degrees of freedom except for those which are adjustable by the at least one actuator. In the event of one single degree of freedom, for example a rotationally fixed shaft guide can block all degrees of freedom up to the one translatory degree of freedom which corresponds to the movement of the actuator.

The handling apparatus can additionally have a spring element which generates a restoring force between the two flange parts and which is directed in opposition to the effect of the force of the static friction-free actuator. The net force exerted onto an external body (for example the workpiece) by the handling apparatus corresponds accordingly to the difference between the actuator force and the restoring force of the spring.

Each gearless static friction-free actuator as well as the abovementioned spring element has a corresponding force-displacement characteristic curve. In the case of a simple spring, this characteristic curve is linearly ascending, in the case of a pneumatic actuator it is descending and pressure-dependent. Together these characteristic curves determine the elastic performance characteristic of the handling apparatus (i.e. net force versus the position of the holder in relation to the manipulator). The closed-loop control device can be realized for the purpose of adjusting the force-displacement characteristic curve of the actuator (or of the actuators) such that the handling apparatus has a predetermined elastic performance characteristic.

As already mentioned, the actuator may be a pistonless pneumatic actuator, a static friction-free pneumatic cylinder or an electric gearless direct drive. In the case of the electric direct drive, there is a current-dependent force-displacement characteristic curve in place of a pressure-dependent force-displacement characteristic curve.

In order to adapt the force-displacement characteristic curve of the spring element to the characteristic curve of the actuator in at least an approximate manner, the outwardly effective force-displacement characteristic curve of the spring can be modified by a kinematic arrangement (i.e. a lever mechanism) to the force-displacement characteristic curve of the static friction-free pneumatic actuator.

The sensor unit can have a positional sensor for each actuator for measuring the length (displacement) of the respective actuator. As an alternative to this, it is possible to provide a sensor which is realized for the purpose of determining the position of the holder in relation to the first flange part (i.e. to the manipulator).

In the case of pneumatic actuators, the sensor unit can be realized for the purpose of calculating the force acting on the actuator as well as the position of the holder in relation to the first flange part from the measured length (displacement) of the at least one and from the pressure prevailing in the actuator.

For applications under water or for applications where air flows are a nuisance, an exhaust air duct of the pneumatic actuator may be connected to a hose which directs the exhaust air away from the handling apparatus so that no air flows occur in the vicinity of the apparatus. In addition, the handling apparatus can be sealed against the incursion of water and/or dust.

A further example embodiment relates to a system including a manipulator with at least one degree of freedom, a handling apparatus fastened on the manipulator as described above and a tool arranged on the handling apparatus for contact tasks. In addition, a regulating unit for regulating the force exerted onto a workpiece by the tool is provided, wherein the regulating unit is realized for the purpose of roughly positioning the workpiece by means of the manipulator and of carrying out the precise positioning and the regulating of the force by means of the handling apparatus.

As an alternative to this, the handling apparatus can be operated in a purely passive manner as a sensor unit and the force can be regulated just by means of the drive of the manipulator. In both cases there is mechanical decoupling between the workpiece and the inert mass of the manipulator by means of the adjustable elasticity of the handling apparatus.

Although the invention has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. An apparatus for automated contact tasks, the apparatus comprising:
   a mechanical interface for connecting the apparatus to a manipulator;
   a holder for receiving a tool, the holder being movable in relation to the mechanical interface;
   at least one actuator for positioning the holder in relation to the mechanical interface;
   a sensor unit configured to sense an actuator force provided by the at least one actuator; and
   a control unit that is configured to:
      set the actuator force to a desired minimum force to press the holder against a stop, while there is no contact between the tool and a surface;
      detect contact when the holder moves in relation to the mechanical interface in opposition to the direction of the desired minimum force; and
      regulate the actuator force according to a pre-programmed contact force time-characteristic, when contact between the tool and the surface has been detected, wherein, once contact has been detected, the actuator force is increased from the minimum force to a desired contact force.

2. The apparatus of claim 1, wherein the pre-programmed contact force time-characteristic defines an increase of the actuator force from the minimum force to the desired contact force within a pre-programmable time interval.

3. The apparatus of claim 2, wherein the actuator force increases linearly within the pre-programmable time interval.

4. The apparatus of claim 1, wherein the control unit is further configured to detect loss of contact.

5. The apparatus of claim 4, wherein the control unit is further configured to regulate the contact force, as a reaction to a detected loss of contact, such that the contact force is reduced to the minimum force.

6. The apparatus of claim 1, where the control unit is configured to detect loss of contact when the holder reaches the stop as a result of the actuator force.

7. The apparatus of claim 6, wherein the sensor unit comprises a displacement sensor configured to measure the relative position between the interface and the holder.

8. The apparatus of claim 1, further comprising:
   a spring element arranged between the mechanical interface and the holder to exert a restoring force on the actuator.

9. The apparatus of claim 1, wherein:
   the actuator is a pneumatic linear actuator;
   the sensor unit comprises at least one position sensor associated with the at least one actuator and configured to measure the position of the holder in relation to the mechanical interface; and
   the sensor unit is configured to calculate the actuator force based on the measured position and a pressure prevailing in the pneumatic linear actuator.

10. The apparatus of claim 1, wherein the actuator is a pneumatic linear actuator, and wherein a duct forming an air outlet of the actuator is connected to a hose which conducts the outlet air away from the actuator.

11. The apparatus of claim 1, wherein the actuator is a pneumatic actuator composed of a piston movably arranged in a cylinder, wherein surfaces of piston and cylinder that slide on each other are made of materials such that the piston can slide in the cylinder substantially without static-friction.

12. A method for handling objects or for processing surfaces using a manipulator carrying a handling apparatus that includes at least one actuator coupling a mechanical interface, which is connected to the manipulator, with a holder, on which a tool is mounted, the method comprising:
   setting an actuator force to a desired minimum force pressing the holder against a stop, while there is no contact between the tool and a surface;
   detecting contact when the holder moves in relation to the mechanical interface in opposition to the direction of the desired minimum force; and
   regulating the actuator force according to a pre-programmed contact force time-characteristic, when contact between the tool and the surface has been detected, wherein, once contact has been detected, the actuator force is increased from the minimum force to a desired contact force.

13. The method of claim 12, wherein the pre-programmed contact force time-characteristic defines an increase of the actuator force from the minimum force to the desired contact force within a pre-programmable time interval.

14. The method of claim 13, wherein the actuator force increases linearly within the pre-programmable time interval.

15. The method of claim 12, further comprising:
   detecting loss of contact between the tool and the surface; and
   reducing the actuator force to the desired minimum force when loss of contact has been detected.

16. The method of claim 15, wherein detecting loss of contact comprises:
   detecting when the holder reaches the stop as a result of the actuator force.

17. The method of claim 16, wherein detecting when the holder reaches the stop comprises:
   measuring the relative position of the holder in relation to the mechanical interface; and
   determining whether the holder has reached the stop based on the measured relative position.

* * * * *